Patented Sept. 8, 1936

2,053,616

UNITED STATES PATENT OFFICE 2,053,616

DYEING PREPARATIONS

Albert Landolt, Riehen, near Basel, Switzerland, assignor to the firm of Society of Chemical Industry in Basle, Basel, Switzerland No Drawing. Application January 12, 1935, Serial No. 1,568. In Switzerland January 15, 1934

11 Claims. (Cl. 8—6)

The acid wool dyestuffs and direct dyeing cotton dyestuffs generally used for dyeing textiles are mostly salts of sulfonated compounds or carboxylated compounds, or both, and as such are generally insoluble in organic solvents. Consequently, they are only suitable in exceptional cases for dyeing masses insoluble in water or lacquers therefrom, such as, for example, natural or artificial resins such as, for instance, copal resin, phenolaldehyde artificial resins, urea-aldehyde artificial resins, condensation products from polybasic acids and polyvalent alcohols, vinyl artificial resins, or lacquers from such resins, further for dyeing cellulose esters or cellulose ethers, such as celluloid, nitrocellulose lacquer, spirit varnishes and the like.

The present invention relates to a process for dyeing the above mentioned masses and the solutions thereof, further for dyeing cellulose esters and cellulose ethers and the solutions thereof, and for printing paper, films, foils and the like. It consists in using such solutions as dyeing preparations which comprise a water-soluble dyestuff containing acid groups, a water-soluble salt of an organic compound containing on the one hand at least one basic nitrogen atom and on the other hand an aliphatic radical containing at least 10 carbon atoms in a straight chain and an organic solvent which dissolves basic dyestuffs. Such preparations may contain, in addition, various materials, for instance further solvents or diluents, water or a product having a hygroscopic effect, such as glycerine; also plasticizers and agents which aid lustre, such as shellac or the like.

The lacquers (nitrocellulose lacquer, spirit varnish or the like) dyed with these preparations may naturally also be used themselves for dyeing the most different materials (wood, metal, paper, leather and the like).

As compared with known processes that of this invention has a series of essential advantages. It has been found that in a surprising manner the dyeings and prints produced with these preparations are remarkably fast to water. This fastness to water is apparently based on the fact that the water-soluble dyestuff and the water-soluble salt of the base form a water-insoluble compound, which could not be expected at all. Further it is possible to produce the preparations in a concentrated but yet stable and remarkably thinly liquid form. This has the result that, for example when printing paper, the consumption of the printing color and the depth of the print can be controlled with ease and that even in producing strong color effects a free penetration of the paper to be printed and thereby the production of good prints fast to rubbing is warranted. As compared with the prints attainable with basic dyestuffs, the present process represents an essential progress, prints being obtained which are considerably faster to light.

The preparations of the present process can be produced either by mixing the dyestuffs in a dry state with the equivalent quantity of the salt of the nitrogenous compound and dissolving in a suitable solvent, or by precipitating the dyestuff dissolved in water with an aqueous solution of the salt of the nitrogenous compound, filtering the conversion product formed, drying and dissolving in the desired solvent. Moreover, further additions can be added to the solutions thus prepared, as mentioned above.

"Dyestuffs containing acid groups" include the most various dyestuffs containing one or more sulfonic acid or carboxylic acid groups, or both kinds of group, as such there may be used, for example:—

(a) As dyestuffs of the azo-series—

Orange II_____ (Colour Index No. 151)
Kiton Red 6B_____ (Colour Index No. 57)
Kiton Fast Orange G____ (Colour Index No. 27)
Acid Black HA_____ (Colour Index No. 246)
Fast Cloth Blue GTB____ (Colour Index No. 289)
Chrome Fast Red B_____ (Colour Index No. 652)

also azo-dyestuffs of the constitution—

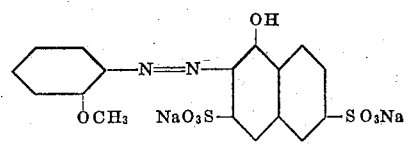

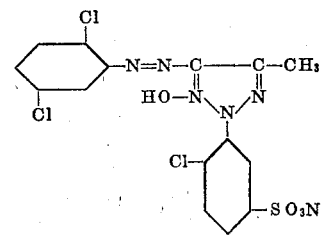

also metalliferous azo-dyestuffs, for example, the chromium compound of the azo-dyestuff of the following constitution:

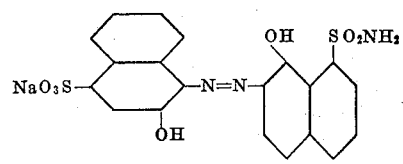

(b) As dyestuffs of the anthraquinone series—
Alizarine cyanine green EF,
(Colour Index No. 1078)
Alizarine direct violet R___(Colour Index No. 1074)

(c) As a dyestuff of the triphenylmethane series—

Xylene blue AS _____ (Colour Index No. 673)
Eosine _____ (Colour Index No. 768)

(d) As dyestuffs of the azine series—

Xylene fast blue BL and GL
(Colour Index Supplement, page 55)

As water-soluble salts of nitrogenous organic compounds may be named salts of such compounds:—

(a) In which the aliphatic radical containing at least 10 carbon atoms is united directly to the basic nitrogen atom, for instance water-soluble salts of aliphatic amines of high molecular weight, such as the hydrochloride of hexadecylamine of the formula

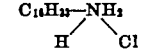

of octodecylamine of the formula

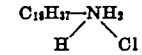

of diethylcetylamine of the formula

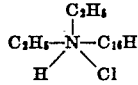

(obtainable from diethylamine and cetylchloride), of dimethyloctodecylamine of the formula

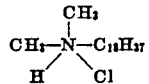

(obtainable from dimethylamine and octodecylchloride), of diethyloctodecenylamine of the formula

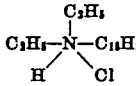

(obtainable from diethylamine and octodecenylchloride) or the like. Instead of the hydrochlorides there may be used the corresponding quaternary ammonium compounds, for example, the hexadecylpyridinium chloride of the formula

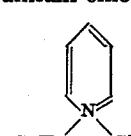

(obtainable from pyridine and hexadecylchloride), the octodecylpyridinium bromide of the formula

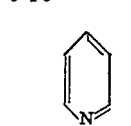

(obtainable from pyridine and octodecylbromide), the octodecyltrimethylammonium-sulfomethylate of the formula

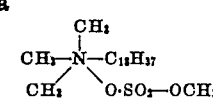

(obtainable by alkylating dimethyloctodecylamine—produced by treating the hydrochloride of dimethyloctodecylamine with an alkalihydroxide—with dimethylsulfate), the benzylcetyldiethylammonium chloride of the formula

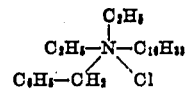

(obtainable by treating diethylcetylamine with benzylchloride), the cetyltriethylammonium chloride of the formula

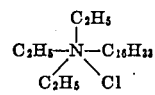

(obtainable by treating triethylamine with cetylchloride) or the like;

(b) In which the aliphatic radical containing at least 10 carbon atoms is united indirectly to the basic nitrogen atom, for example in the manner of an amide, an ester or an ether or in any other manner; examples are salts of diamines, unilaterally mono- or diacylated by means of fatty acids of high molecular weight, for instance the trimethylammonium sulfomethylate of the monostearoylethylene-diamine of the formula

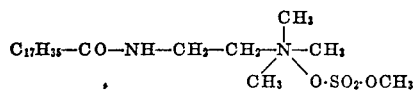

(cf. Patent No. 1,737,458, Example 3), the hydrochloride of oleoyl-diethylethylene-diamine of the formula

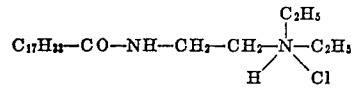

(cf. Patent No. 1,534,525, Example 9), the hydrochloride of oleoyl-diethyl-propylene-diamine of the formula

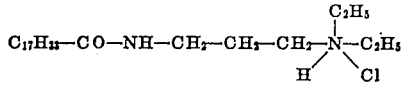

(cf. German Patent No. 559,500, Example 4), the hydrochloride of the oleoyl-benzoyl-diethylethylenediamine of the formula

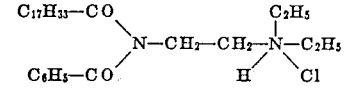

(cf. German Patent No. 559,500, Example 6), the oleoylamino-ethyl-diethyl-allylammonium bromide of the formula

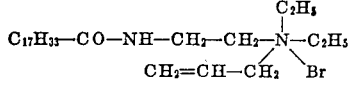

(cf. German Patent No. 559,500, Example 7), the oleoylamino-ethyl-triethylammonium-para-toluene sulfonate of the formula

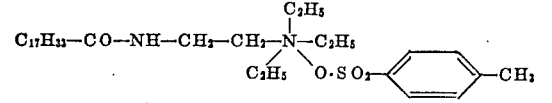

(cf. German Patent No. 559,500, Example 8), the hydrochloride of the oleoylpiperidyl-N-ethylamide of the formula

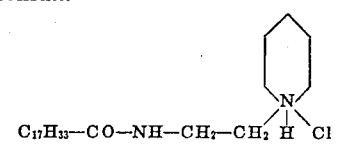

(cf. Patent No. 1,534,525, Example 6), the hydrochloride of the oleoyl-β-hydroxy-γ-diethyl-propylenediamine of the formula $$C_{17}H_{33}-CO-NH-CH_2-CHOH-CH_2-\underset{H}{\overset{C_2H_5}{\underset{|}{N}}}\underset{Cl}{\overset{C_2H_5}{\diagdown}}$$

(cf. Patent No. 1,805,355, Example 1), the hydrochloride of the para-oleoylaminophenyl-diethyl-aminoethyl-methylamine of the formula $$C_{17}H_{33}-CO-NH-\underset{}{\underset{}{\bigcirc}}-\underset{CH_3}{\overset{}{\underset{|}{N}}}-CH_2-CH_2-\underset{H}{\overset{C_2H_5}{\underset{|}{N}}}\underset{Cl}{\overset{C_2H_5}{\diagdown}}$$

(cf. Patent No. 1,894,375, Example 4); the para-stearoylaminophenyl-trimethyl-ammonium-sulfomethylate of the formula $$C_{18}H_{37}-CO-NH-\bigcirc-\underset{CH_3}{\overset{CH_3}{\underset{|}{N}}}\underset{O.SO_2.OCH_3}{\overset{CH_3}{\diagdown}}$$

(cf. German Patent No. 559,500, Example 10); salts of monoacyl-piperazines (cf. Fourneau, Bull. Soc. Chim. France, [4] 45, page 1172–89) or the like; also salts of acylated polyalkylene-polyamines obtainable by partially acylating by means of a fatty acid of high molecular weight, for instance diethylenetriamine $$NH_2-CH_2-CH_2-NH-CH_2-CH_2-NH_2,$$

triethylene-tetramine $$NH_2-CH_2-CH_2-NH-CH_2-CH_2-\\NH-CH_2-CH_2-NH_2$$

or the like, which can subsequently be alkylated, for example, by means of ethylene-oxide (cf. Patent No. 1,947,951). There come into question also mixed ethers, for instance, from cetyl alcohol and N-ω-hydroxy-methylpyridinium chloride of the formula $$C_{16}H_{33}-O-CH_2-\overset{}{\underset{}{\bigcirc}}\overset{}{\underset{Cl}{N}}$$

(obtained for instance from pyridine and ω-chlormethylcetylether, the latter being obtained by causing formaldehyde and hydrogen chloride to react with cetyl alcohol), the chlorhydrate of diethylamino-ethyloctodecylcarbonate of the formula $$C_{18}H_{37}-O-\underset{O}{\overset{}{\underset{\|}{C}}}-O-CH_2-CH_2-\underset{H}{\overset{C_2H_5}{\underset{|}{N}}}\underset{Cl}{\overset{C_2H_5}{\diagdown}}$$

(obtained by the reaction of diethylaminoethanol with chlorocarbonic acid octo-decyl ester, the latter being obtained by treating octo-decyl alcohol with phosgene), salts of esters, for example from stearic acid and dimethyl- or diethylaminoethanol of the formulas $$C_{17}H_{35}-CO-O-CH_2-CH_2-\overset{CH_3}{\underset{|}{N}}-CH_3$$

or $$C_{17}H_{35}-CO-O-CH_2-CH_2-\overset{C_2H_5}{\underset{|}{N}}-C_2H_5,$$

the chloride of the stearic acid ester of choline of the formula $$C_{17}H_{35}-CO-O-CH_2-CH_2-\underset{CH_3}{\overset{CH_3}{\underset{|}{N}}}\underset{Cl}{\overset{CH_3}{\diagdown}}$$

(cf. Fourneau, Bull. Soc. Chim. France [4] 15, page 549), the stearic acid ester of N-ω-hydroxyethyl-pyridinium chloride of the formula $$C_{17}H_{35}-CO-O-CH_2-CH_2-\overset{}{\underset{}{\bigcirc}}\overset{}{\underset{Cl}{N}}$$

cf. Appln. Serial No. 619,356), the stearic acid ester of the addition product of glycerin-monochlorhydrin or α:α'-glycerin-dichlorhydrin and pyridine of the formulas $$C_{17}H_{35}-CO-O-CH-CH_2-\overset{}{\underset{}{\bigcirc}}\overset{}{\underset{Cl}{N}}\\ \phantom{XXXXX}|\\ \phantom{XXXXX}CH_2Cl$$

or $$C_{17}H_{35}-CO-O-CH_2-CHOH-CH_2-\overset{}{\underset{}{\bigcirc}}\overset{}{\underset{Cl}{N}}$$

the palmitic acid ester of 1-hydroxyphenyl-3-trimethylammoniumchloride of the formula $$C_{15}H_{31}-CO-O-\bigcirc-\underset{CH_3}{\overset{CH_3}{\underset{|}{N}}}\underset{Cl}{\overset{CH_3}{\diagdown}}$$

(obtainable from palmitic acid and m-hydroxydimethylaniline and subsequent condensation of the reaction product with methyl chloride). Further, salts of compounds which contain the imidazole radical, like the hydrochloride of pentadecyldihydroimidazole of the formula $$C_{15}H_{31}-C\begin{array}{c}NH-CH_2\\ \diagdown\phantom{XX}|\\ \phantom{X}N-CH_2\\ \underset{H}{|}\phantom{XX}\underset{Cl}{}\end{array}$$

(obtainable by reaction between the imino-ether of palmitic acid and ethylene-diamine and converting the base into the hydrochloride), the μ-heptadecenyl-dibenzyl-benzimidazolium chloride of the formula $$\begin{array}{c}CH_2-C_6H_5\\|\\ \text{benzimidazole ring with}\\ C-C_{17}H_{33}\\ \underset{C_6H_5CH_2}{|}\phantom{XX}\underset{Cl}{}\end{array}$$

(cf. Appln. Ser. No. 743,483), or the μ-heptadecyl-ethyl-methyl-benzimidazolium chloride of the formula $$\begin{array}{c}CH_3\\|\\ \text{benzimidazole ring with}\\ C-C_{17}H_{35}\\ \underset{C_2H_5}{|}\phantom{XX}\underset{Cl}{}\end{array}$$

(obtainable by treating with ethyl chloride the μ-heptadecyl-methylbenzimidazole obtained from mono-methyl-ortho-phenylene-diamine and stearoyl chloride). Further, there can even be used basic urethanes, such as the addition product of dimethylsulfate to diethyl-aminoethyl-cetyl-urethane of the formula

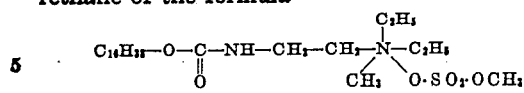

(the diethyl-aminoethyl-cetyl-urethane being obtained by causing asymmetric diethyl-ethylenediamine to react with chlorocarbonic acid cetyl ester, the latter being obtained by treating cetyl alcohol with phosgene) or to meta-dimethylaminophenyl-cetyl-urethane of the formula

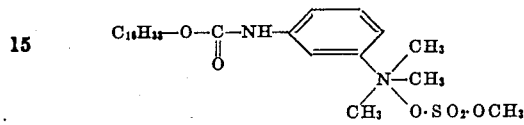

(the meta-dimethylaminophenyl-cetyl-urethane being obtained by causing asymmetric dimethyl-meta-phenylene-diamine to react with chlorocarbonic acid cetyl ester, the latter being obtained by treating cetyl alcohol with phosgene), or the like.

Of the above mentioned water-soluble salts of nitrogenous organic compounds those are particularly suitable whose basic nitrogen atom forms a member of a heterocyclic ring or is directly united with an aromatic nucleus; among these the stearic acid ester of N-ω-hydroxyethylpyridinium chloride, the μ-heptadecyl-ethyl-methyl-benzimidazolium chloride and the para-stearoyl-aminophenyl-trimethylammonium - sulfomethylate are particularly valuable.

In all these compounds the stearic acid radical, the palmitic acid radical or the oleic acid radical may be exchanged for another acid radical, for example that of capric acid, of lauric acid, of myristic acid, of ricinoleic acid or the like. Moreover, the alcoholic radicals, such as that of cetyl alcohol, may be exchanged for the radical of the alcohol which corresponds with one of the above named acids, for instance for that of oleyl alcohol. So also the pentadecyl-radical, the hexadecyl-radical, the heptadecyl-radical, the heptadecenyl-radical or the octodecyl-radical may be exchanged for other saturated or unsaturated alkyl radicals containing at least 10 carbon atoms, such as the decyl-, undecyl-, dodecyl-, tetradecyl- radical, or the like.

As organic solvents there come into consideration such solvents which dissolve basic dyestuffs, such as Auramine (Colour Index No. 655), Fast Green JJO (loc. cit. No. 662), Crystal Violet 5BO (loc. cit. No. 681), Victoria Blue B (loc. cit. No. 729), Methylene Blue B (loc. cit. No. 922), Rhodamine B (loc. cit. No. 749), and the like. Such solvents are, for example, diethylene glycol, i. e. di-(β-hydroxyethyl)-ether, or one or more solvents capable of being mixed with diethylene glycol, such as methyl-, ethyl-, propyl-, butyl-, or amyl-alcohol, butylacetate, amylacetate, cyclohexylacetate, lactic acid ethylester, acetoacetic ester, butylglycol, i. e. ethyleneglycolmonobutyl-ether, glycerine, acetone, dioxane, carbon disulfide, chloroform, trichlorethylene, ethylenechlorhydrine, benzene, cyclohexanol, tetraline, monochlorbenzene, oil of turpentine, pine oil, and the like. Among these the solvents having alkoxylated hydroxyl-groups are particularly suitable, and diethyleneglycol and butylglycol are particularly valuable.

The following examples illustrate the invention:—

*Example 1*

10 parts by weight of Orange II (Colour Index No. 151) are dissolved in water, precipitated with an aqueous solution of 26 parts by weight of para-stearoylaminophenyl-trimethylammonium-sulfo-methylate, and the precipitate is filtered, washed out and dried. The lacquer thus obtained is pulverized, dissolved in 400 parts by volume of commercial nitrocellulose lacquer, and the solution poured onto a suitable substratum whereby films are formed. There is obtained a transparent, deeply orange dyed film.

When substituting the same quantity of Acid Black HA, (loc. cit. No. 246) for the Orange II, and precipitating the dyestuff dissolved in water with an aqueous solution of 4 parts by weight of para-stearoylaminophenyl-trimethyl-ammoniumsulfomethylate, there is obtained a dark blue-green transparent film.

*Example 2*

5 parts by weight of Cloth Fast Blue GTB (Colour Index No. 289) are mixed with 5 parts of para-stearoylaminophenyl-trimethylammoniumsulfomethylate. This mixture is dissolved, for the purpose of making the printing colour, in a mixture of solvents consisting of 70 parts by volume of ethyl alcohol and 20 parts by volume of glycerine.

The printing colour is, if necessary, after filtration, printed on the paper and dried; there are obtained in this manner powerful dark blue prints of good fastness to light, water and rubbing.

With a like result the mixture of solvents described above may be exchanged for one consisting of 40 parts by volume of ethyl alcohol, 20 parts of ethylene-glycol-monobutyl ether, 20 parts of glycerin and 10 parts of water.

When the same proportion of Xylene Fast Blue BL (Colour Index Supplement, page 55) is used instead of Cloth Fast Blue GTB, there is obtained a vivid, pure, strong colored, dark blue print of good fastness to light, to water and rubbing.

Starting from 5 parts by weight of Alizarine Fast Green (Schultz, Farbstofftabellen, 7th edition, vol. I, No. 1201) and 8.5 parts of para-stearoylaminophenyl - trimethylammoniumsulfo-methylate there is obtained a blue-green print, fast to light, water and rubbing.

*Example 3*

10 parts by weight of the chromiferous azo-dyestuff obtainable by coupling diazotized 1-amino-2-hydroxynaphthalene-4-sulfonic acid with 1 - (3' - sulfoamido) - phenyl - 3 - methyl - 5 - pyrazolone and subsequent treatment with agents yielding chromium, are dissolved in water, precipitated with an aqueous solution of 5.5 parts by weight of para-stearoylaminophenyl-trimethyl-ammonium-sulfomethylate, and the precipitate is filtered, washed out and dried. The lacquer thus obtained is pulverized, dissolved in 50 parts by volume of butylglycol, then added to a mixture of 100 parts by volume of ethylalcohol, 50 parts by volume of glycerine and 25 parts by volume of water, and printed on paper. There is obtained a blue-red print of very good fastness to water and light.

When substituting the same quantity of Kiton Yellow 3G (Colour Index No. 645) for the chromiferous azo-dyestuff used, 9.2 parts by weight of heptadecyl - ethyl - methyl - benzimidazolium-chloride for the nitrogenous compound, and carrying out the further operations as indicated above, there is obtained a pure-yellow print which is fast to water and light.

As previously stated, instead of the dyestuffs named in the above examples and the nitrogenous compound, one or more dyestuffs containing sulfonic acid or carboxylic acid groups, or both kinds of groups, and other nitrogenous compounds falling within the invention and in any suitable proportion to each other, may be used.

What I claim is:—

1. Dyeing preparations consisting of an acid dyestuff and of a water-soluble salt of an organic compound comprising on the one hand at least one basic nitrogen atom and on the other hand an aliphatic radical comprising at least 10 carbon atoms in a straight chain, dissolved in an organic solvent which dissolves basic dyestuffs.

2. Dyeing preparations consisting of an acid dyestuff and of a water-soluble salt of an aliphatic amine containing an aliphatic radical comprising at least 10 carbon atoms in a straight chain, dissolved in an organic solvent which dissolves basic dyestuffs.

3. Dyeing preparations consisting of an acid dyestuff and of a water-soluble salt of an aliphatic diamine unilaterally substituted by an acyl radical comprising at least 10 carbon atoms in a straight chain, dissolved in an organic solvent which dissolves basic dyestuffs.

4. Dyeing preparations consisting of an acid dyestuff and of the trimethylammonium sulfomethylate of the monostearoylethylene diamine, dissolved in an organic solvent which dissolves basic dyestuffs.

5. Dyeing preparations consisting of an acid dyestuff and of a water-soluble salt of an aromatic amine containing an aliphatic radical comprising at least 10 carbon atoms in a straight chain, dissolved in an organic solvent which dissolves basic dyestuffs.

6. Dyeing preparations consisting of an acid dyestuff and of a water-soluble salt of an aromatic diamine unilaterally substituted by an acyl radical comprising at least 10 carbon atoms in a straight chain, dissolved in an organic solvent which dissolves basic dyestuffs.

7. Dyeing preparations consisting of an acid dyestuff and of the para-stearoylaminophenyl-trimethylammonium-sulfomethylate, dissolved in an organic solvent which dissolves basic dyestuffs.

8. Dyeing preparations consisting of an acid dyestuff and of a water-soluble salt of a heterocyclic amine containing an aliphatic radical comprising at least 10 carbon atoms in a straight chain, dissolved in an organic solvent which dissolves basic dyestuffs.

9. Dyeing preparations consisting of an acid dyestuff and of a water-soluble salt of a benzimidazole compound containing an aliphatic radical comprising at least 10 carbon atoms in a straight chain, dissolved in an organic solvent which dissolves basic dyestuffs.

10. Dyeing preparations consisting of an acid dyestuff and of the $\mu$-heptadecyl-ethyl-methyl-benzimidazolium-chloride, dissolved in an organic solvent which dissolves basic dyestuffs.

11. Dyeing preparations consisting of an acid dyestuff and of $\mu$-heptadecyl-ethyl-methyl-benzimidazolium chloride, dissolved in ethyleneglycol-monobutyl-ether.

ALBERT LANDOLT.